United States Patent [19]
Liang

[11] Patent Number: 5,482,620
[45] Date of Patent: Jan. 9, 1996

[54] PERMEABLE DITCH UNDERWATER WATER PURIFICATION APPARATUS

[76] Inventor: Kecheng Liang, 503 Room, 5-2 Jiansheheng Street, Guangzhou, China

[21] Appl. No.: 274,846

[22] Filed: Jul. 14, 1994

[30] Foreign Application Priority Data

Nov. 1, 1993 [CN] China .................. 93114085.4

[51] Int. Cl.$^6$ ...................................................... E03B 3/12
[52] U.S. Cl. .................... 210/170; 210/203; 210/279; 210/289; 210/291
[58] Field of Search ................... 210/279, 289, 210/291, 170, 747, 199, 198.1, 203

[56] References Cited

U.S. PATENT DOCUMENTS

| | | | |
|---|---|---|---|
| 1,026,612 | 5/1912 | Smith | 210/170 |
| 2,820,701 | 1/1958 | Leslie | 210/289 |
| 3,814,247 | 6/1974 | Hirs | 210/279 |
| 4,013,556 | 3/1977 | Evans | 210/289 |
| 4,211,656 | 7/1980 | Cochrane | 210/279 |
| 4,238,335 | 12/1980 | Grimsley | 210/802 |
| 4,543,013 | 9/1985 | Wagner et al. | 210/170 |
| 4,714,551 | 12/1987 | Bachhofer et al. | 210/279 |
| 4,865,734 | 9/1989 | Schulz | 210/279 |
| 5,203,995 | 4/1993 | Ferdando | 210/279 |

FOREIGN PATENT DOCUMENTS

| | | | |
|---|---|---|---|
| 86104417 | 6/1986 | China . | |
| 2721505 | 11/1978 | Germany | 210/279 |
| 1636012 | 3/1991 | U.S.S.R. | 210/279 |

Primary Examiner—Peter A. Hruskoci
Assistant Examiner—Theodore Green
Attorney, Agent, or Firm—Beveridge, DeGrandi, Weilacher & Young

[57] ABSTRACT

A permeable ditch underwater water purification apparatus purifies source water using the principle of self-purification of water. This apparatus includes impermeable ditch walls on a tapered bottom. The apparatus also has an open top side. A granular filter layer is filled in the ditch body. Collector (counter-rinsing) pipes are provided at the bottom of the granular filter layer, and a filter protecting layer is provided on the surface of the granular filter layer. This apparatus can maintain the thickness of the granular filter layer all the year round. When blockage of the filter layer occurs, water from another ditch is pumped, and the remaining impurities in the granular filter layer can be forced away by water pumped into the collector (counter-rinsing) pipe. After sterilization by adding an appropriate amount of chlorine into the purified water, the quality of water will meet the standards for drinking water in effect in China, and the purified water may be supplied directly for use by the users.

22 Claims, 1 Drawing Sheet

PERMEABLE DITCH UNDERWATER WATER PURIFICATION APPARATUS

FIELD OF THE INVENTION

The present invention relates to a novel underwater water purification apparatus, and particularly to a permeable ditch water purification apparatus located about 1500 mm under the water level.

BACKGROUND OF THE INVENTION

Normally, there is no counter-rinsing pipe or no effective counter-rinsing pipe in existing riverbed permeable ditches. They can only be built in highly permeable riverbeds of considerable thickness. These permeable ditches catch impurities in water by using natural or artificial permeable layers as filters to attain the object of purification of river water. During the functioning of these permeable ditches, the amount of impurities caught by the natural or artificial filters may continuously increase due to the changes in water quality, resulting in that these permeable ditches commonly produce turbid permeated ditch water (usually with turbidity higher than degree 5), and resulting in the blockage of the permeable ditches. This, in turn, causes a decrease in the water produced per unit time with an increase of the functioning time of the permeable ditch, thereby, the requirements of the design can not be attained.

The riverbed purification filtering apparatus described in Chinese Patent CN86104417 is an example of using artificial filters. In the disclosed apparatus, a purification filtering layer is positioned in the space sandwiched between the inner and outer well walls and confined by the tapered bottom of the well and a cover of the well wall, wherein rinsing porous branch pipes are provided adjacent to the outer well wall. In this device, remaining impurities in the filtering layer can be removed to keep the quality of water of the water source always clear, as well as to prevent the draw down phenomenon of the well. However, this apparatus still belongs to the field of side permeating filtering which can only be built in permeable riverbeds of certain permeability. Furthermore, the well wall cover is a reinforced concrete plate, which makes construction and maintenance of the filtering layer complex.

SUMMARY OF THE INVENTION

Therefore, it is an object of the present invention to provide a permeable ditch underwater water purification apparatus capable of keeping the ditch water clear all the year round, and preventing the permeable ditch from being blocked, as well as simplifying the procedure of purification.

The object of the present invention is realized as follows: a 1000 mm thick layer of granular filters having diameter 0.6–1.2 mm is provided in an open permeable ditch. During the functioning of this layer, source water enters from the top and moves into the porous collector pipes (counter-rinsing pipes) in the ditch through the surface of the granular filter layer. The water collected by the collector (counter-rinsing) pipes can meet the national standard for drinking water after being drawn by a pump and then sterilized. According to the present invention, the remaining caught substances in the filtering layer can be removed periodically by pressing air-pressurized water into the collector (counter-rinsing) pipes provided at the bottom of the purification filtering layer. Thus, the problem of blockage of the permeable ditch can be solved.

BRIEF DESCRIPTION OF THE DRAWINGS

The following is a detailed description of the present invention with reference to the accompanying drawings and preferred embodiment thereof.

DETAILED DESCRIPTION OF EMBODIMENTS OF THE PRESENT INVENTION

Figure 1:
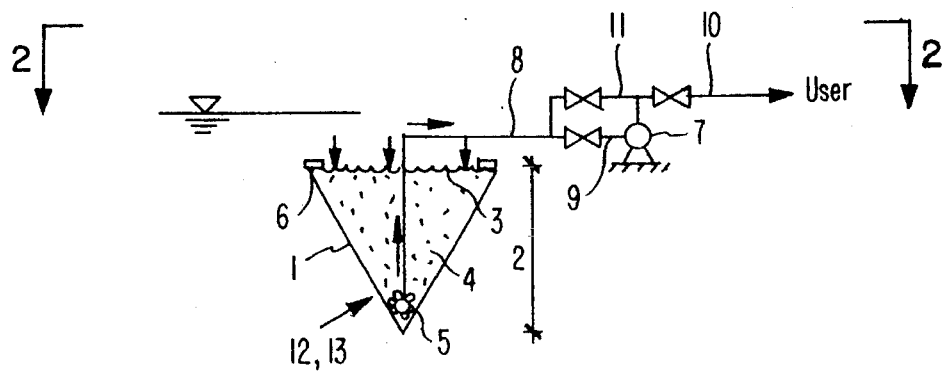
FIG. 1 is a diagrammatical top view of the permeable ditch underwater water purification apparatus according to the present invention showing two apparatuses (12) and (13) having the same features which can be used together.
Figure 2:
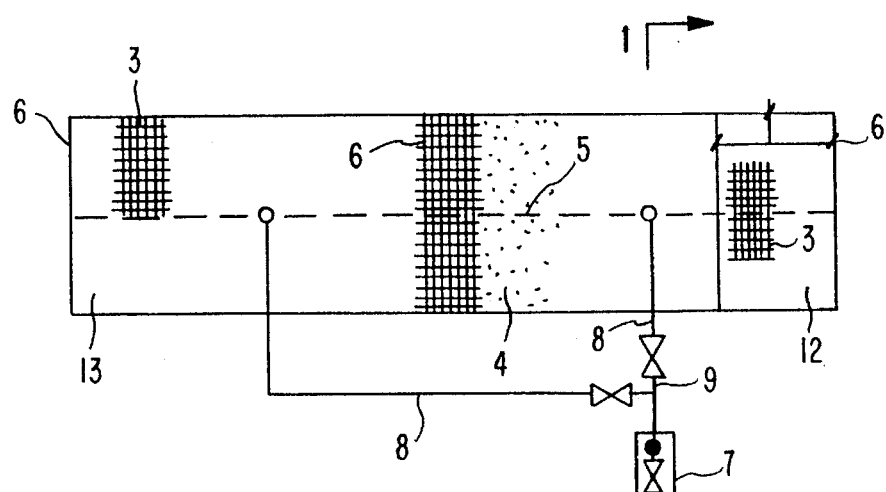
FIG. 2 is a sectional view taken along line 2—2 of FIG. 1.

FIGS. 1 and 2 illustrate the apparatus in accordance with the invention. FIG. 1 is a sectional view taken along line 1—1 in FIG. 2. As shown, two separate ditch units 12 and 13 may be connected to a single pump 7. Referring to FIGS. 1 and 2, a layer of granular filters 4 having a diameter d=0.6–1.2 mm and a total thickness (reference number 2 in FIG. 1) of 1000 mm is provided in the open permeable ditch 1 and within the unpermeable sealing plates 6 at the two ends of the ditch. A filter protecting layer 3 covers the upper opening of the permeable ditch. The filter protecting layer 3 is composed of two stainless steel nets of 20 meshes, and a steel bar net covers the stainless steel nets. The steel bar of the steel bar net has a diameter of 10 mm, the mesh size of the steel bar net is 100 mm, and the steel bar net is used for protecting the stainless steel nets. The periphery of the protecting layer 3 is fixed on the permeable ditch 1 with a peripheral frame, which prevents the filters from being carried away by the water or impurities. The suction pipe 8 of the pump 7 is provided with an aperture 9 for adding chlorine for sterilization. There is also a parallelly connected suction pipe of the pump which is connected with the porous collector (counter-rinsing) pipe 5, water supply pipe 10 and return rinsing pipe 11.

In the operation of the permeable ditch, the source water can only enter the collector (counter-rinsing) pipes 5 after passing through the purification filtering layer 4 from the upper surface of the ditch and being purified by the layer 4. The granular filter layer 4 is protected in the permeable ditch 1, by protecting layer 3 and sealing plates 6, such that even if it is positioned in the source water, it will not be carried away by the water or impurities. Thus, the granular filter layer 4 of such permeable ditches can maintain its designed thickness all the year round.

When the amount of water produced becomes less than the designed amount of water due to the increase of remaining impurities caught by the granular filter layer 4, the rinsing pump can be started to suck water from another permeable ditch, and the remaining impurities in the granular filter layer 4 can be washed away by water spurted upward from the porous collector (counter-rinsing) pipe 5 via the return rinsing pipe 11 and the suction pipe 8 to recover the designed performance of the granular filter layer. This is the method for removing blockages. In order to rinse effectively, the porous collector (counter-rinsing) pipe 5 is provided at a lower position of the purification filter layer 4.

Figure 3:
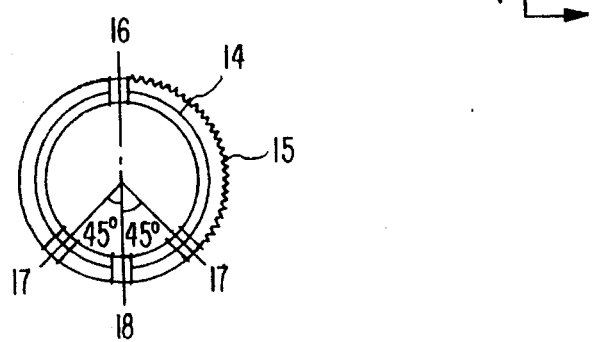
FIG. 3 is a diagram showing the apertures in the porous collector (counter-rinsing) pipe.

The construction of the porous collector pipe 5 is shown in FIG. 3. Pipe wall 14 is surrounded with two layers of stainless steel net 15 having a 20 mesh size. Four rows of apertures are formed in the upper, lower, left and right pipe wall, respectively. The diameter of the upper apertures 16 is 3 mm and the horizontal distance therebetween is 1000 mm.

The diameter of the lower apertures 18 is 3 mm and the horizontal distance therebetween is 500 mm. The left and right rows of apertures are positioned at an angle of 45 degrees with respect to the horizontal line passing through the center of the cross section of the pipe 5. These rows have apertures 17 with a diameter of 3 mm and a horizontal distance between the apertures of 50 mm. Thereby, the filters 4 will not be sucked into the porous collector (counter-rinsing) pipes (5) during the water collecting and counter rinsing operation of the permeable ditch, such that the permeable ditch water can be always kept in good condition.

The permeable ditch underwater water purification apparatus according to the present invention is applicable to rivers, lakes, and reservoirs of type I–V water as specified by GB 3838-88 of China, applicable to the construction of new water supply plants as well as to the reform of old water supply plants on the above-mentioned water sources, applicable to the lakes, and applicable to the construction of water supply plants of various sizes of the above-mentioned water sources. The dimension of the permeable ditch can be as small as one which will produce several tons of water every day, or as large as one which will produce tens of thousands of tons of water every day. Water supply plants of much larger sizes can be constructed using a plurality of ditches.

Conventional permeable ditches may be blocked due to lack of counter rinsing facilities, and can only keep normal water supply for a short period. Thus, they can not fully replace the ground sediment filtering water supply plant. The process flow of the existing sediment filtering water supply plants is normally: water inlet—pump station—adding alum—mixing—reaction—sediment—filtering—sterilizing—clean water pool—second pump station—user. While the underwater purification apparatus according to the present invention has both functions of water intaking and purification filtering, the process flow of the water supply plant is: permeable ditch underwater water purification apparatus—sterilization—pump station—user. The process flow water supply plant can be simplified by using the water purification apparatus according to the present invention, such that the number of processes is reduced from eleven to four, thereby, the area of the plant, investment of capital construction, electrical and machinery instruments, as well as personnel and labor can be saved. Thus, the cost can be reduced, while the quality of water can be ensured to meet the water quality standard of drinking water of China, all the year round. In this manner, great technical and economical benefits, as well as great social benefits, can be achieved.

What is claimed is:

1. A permeable ditch underwater water purification apparatus, comprising:

a ditch body having unpermeable left and right ditch walls and an open upper portion;

a granular filter layer positioned in the ditch body;

a filter protecting layer provided to cover the open upper portion of the ditch body;

a porous collector pipe provided in a lower portion of the ditch body, at the bottom of the granular filter layer, wherein a pipe wall of said porous collector pipe is surrounded by two layers of stainless steel net having a mesh size of 20, wherein the porous collector pipe further includes:

a row of upper apertures formed 1000 mm apart in an upper portion of the porous collector pipe, a row of lower apertures formed 500 mm apart in a lower portion of the porous collector pipe, a row of left apertures formed 50 mm apart in a left side of the porous collector pipe along a first line located at an angle of 45 degrees from a bottom of the porous collector pipe with respect to a line passing through a center of the porous collector pipe, and a row of right apertures formed 50 mm apart in a right side of the porous collector pipe along a second line located at an angle of 45 degrees from the bottom of the porous collector pipe with respect to the line passing through the center of the porous collector pipe;

a suction pump connected to the porous collector pipe via a suction pipe; and a return rinsing pipe connected to the suction pump, and also connected to the porous collector pipe via said suction pipe.

2. A permeable ditch underwater water purification apparatus according to claim 1, wherein the granular filter layer has a thickness of 1000 mm and its granules have a diameter in the range of 0.6–1.2 mm.

3. A permeable ditch underwater water purification apparatus according to claim 1, wherein the filter protecting layer includes a stainless steel net having a mesh size of 20, and wherein a steel bar net is provided over the stainless steel net, wherein steel bars of the steel bar net have a 10 mm diameter, and a distance of 100 mm is provided between the steel bars of the steel bar net, said underwater water purification apparatus further including a fixing peripheral frame which surrounds a periphery of said filter protecting layer, so as to fix said filter protecting layer onto said ditch body.

4. A permeable ditch underwater water purification apparatus according to claim 1, wherein the apertures of each of said rows have a diameter of 3 mm.

5. A permeable ditch underwater water purification apparatus according to claim 1, wherein the granular filter layer has a thickness of 1000 mm.

6. A permeable ditch underwater water purification apparatus according to claim 1, wherein the suction pipe is provided with an inlet for adding chlorine.

7. A permeable ditch underwater water purification apparatus according to claim 1, wherein the suction pipe is provided with an inlet for adding a disinfectant, such that the disinfectant is added before the water reaches the suction pump.

8. A permeable ditch underwater water purification apparatus according to claim 7, wherein the disinfectant is chlorine.

9. A permeable ditch underwater water purification apparatus according to claim 1, wherein substances deposited on the porous collector pipe may be removed therefrom by forcing air pressurized water into said porous collector pipe via said return rinsing pipe.

10. A permeable ditch underwater water purification apparatus, comprising:

a ditch body having unpermeable left and right ditch walls and an open upper portion;

a granular filter layer provided in the ditch body;

a filter protecting layer provided to cover the open upper portion of the ditch body;

a porous collector pipe provided in a lower portion of the ditch body, covered by the granular filter layer, wherein a pipe wall of the porous collector pipe is surrounded by a net, wherein the porous collector pipe further includes:

a row of upper apertures formed in an upper portion of the porous collector pipe, a row of lower apertures formed in a lower portion of the porous collector pipe, a row of left apertures formed in a left side of the porous collector pipe, and a row of right apertures formed in a right side of the porous collector pipe;

a suction pump connected to the porous collector pipe via a suction pipe; and a return rinsing pipe connected to the suction pump, and also connected to the porous collector pipe via the suction pipe.

11. A permeable ditch underwater water purification apparatus according to claim 7, wherein the granular filter layer has a thickness of 1000 mm and its granules have a diameter in the range of 0.6–1.2 mm.

12. A permeable ditch underwater water purification apparatus according to claim 7, wherein the filter protecting layer includes a stainless steel net.

13. A permeable ditch underwater water purification apparatus according to claim 12, wherein a steel bar net is provided over the stainless steel net of the filter protecting layer.

14. A permeable ditch underwater water purification apparatus according to claim 7, further including a fixing peripheral frame which surrounds a periphery of the filter protecting layer to fix the filter protecting layer to the ditch body.

15. A permeable ditch underwater water purification apparatus according to claim 7, wherein the suction pipe is provided with an inlet for adding a disinfectant.

16. A permeable ditch underwater water purification apparatus according to claim 7, wherein substances captured in the filter protecting layer may be removed therefrom by forcing air pressurized water into the porous collector pipe via the return rinsing pipe.

17. A permeable ditch underwater water purification apparatus, comprising:

a first ditch body having unpermeable left and right ditch walls and an open upper portion; a first granular filter layer provided in the first ditch body; a first filter protecting layer provided to cover the open upper portion of the first ditch body; a first porous collector pipe provided in a lower portion of the first ditch body, covered by the first granular filter layer, wherein a pipe wall of the first porous collector pipe is surrounded by a first net, wherein the first porous collector pipe further includes: (a) a row of upper apertures formed in an upper portion of the first porous collector pipe, (b) a row of lower apertures formed in a lower portion of the first porous collector pipe, (c) a row of left apertures formed in a left side of the first porous collector pipe, and (d) a row of right apertures formed in a right side of the first porous collector pipe;

a suction pump connected to the first porous collector pipe via a first suction pipe;

a return rinsing pipe connected to the suction pump, and also connected to the first porous collector pipe via the first suction pipe; and a second ditch body having unpermeable left and right ditch walls and an open upper portion; a second granular filter layer provided in the second ditch body; a second filter protecting layer provided to cover the open upper portion of the second ditch body; a second porous collector pipe provided in a lower portion of the second ditch body, covered by the second granular filter layer, wherein a pipe wall of the second porous collector pipe is surrounded by a second net, wherein the second porous collector pipe further includes: (a) a row of upper apertures formed in an upper portion of the second porous collector pipe, (b) a row of lower apertures formed in a lower portion of the second porous collector pipe, (c) a row of left apertures formed in a left side of the second porous collector pipe, and (d) a row of right apertures formed in a right side of the second porous collector pipe;

wherein the second porous collector pipe of the second ditch body is connected to the suction pump such that water from the second ditch body may be provided into the first porous collector pipe of the first ditch body via the return rinsing pipe.

18. A permeable ditch underwater water purification apparatus according to claim 17, wherein the first granular filter layer has a thickness of 1000 mm and its granules have a diameter in the range of 0.6–1.2 mm.

19. A permeable ditch underwater water purification apparatus according to claim 17, wherein the first filter protecting layer includes a stainless steel net.

20. A permeable ditch underwater water purification apparatus according to claim 19, wherein a steel bar net is provided over the stainless steel net of the first filter protecting layer.

21. A permeable ditch underwater water purification apparatus according to claim 17, further including a fixing peripheral frame which surrounds a periphery of the first filter protecting layer to fix the first filter protecting layer to the first ditch body.

22. A permeable ditch underwater water purification apparatus according to claim 17, wherein the suction pipe is provided with an inlet for adding a disinfectant.

\* \* \* \* \*